(12) United States Patent
Ellis

(10) Patent No.: US 8,590,583 B2
(45) Date of Patent: Nov. 26, 2013

(54) POTTING APPARATUS

(75) Inventor: Sean Mitchell Ellis, Semmes, AL (US)

(73) Assignee: Mitchell Ellis Products, Inc., Semmes, AL (US)

( * ) Notice: Subject to any disclaimer, the term of this patent is extended or adjusted under 35 U.S.C. 154(b) by 0 days.

(21) Appl. No.: 13/485,272

(22) Filed: May 31, 2012

(65) Prior Publication Data

US 2012/0285580 A1  Nov. 15, 2012

(51) Int. Cl.
*B65B 43/42* (2006.01)
*B67C 3/00* (2006.01)

(52) U.S. Cl.
USPC ............................ 141/129; 141/177; 141/231

(58) Field of Classification Search
USPC ................ 141/1, 71, 80, 129, 139, 177, 231
See application file for complete search history.

(56) References Cited

U.S. PATENT DOCUMENTS

| | | | | |
|---|---|---|---|---|
| 2,728,510 A | * | 12/1955 | Dunnican et al. | 141/125 |
| 2,826,003 A | * | 3/1958 | Oki et al. | 47/1.01 R |
| 3,587,675 A | * | 6/1971 | DiTucci | 141/75 |
| 3,655,064 A | * | 4/1972 | Mayer | 211/78 |
| 3,657,839 A | | 4/1972 | Krause | |
| 3,713,465 A | | 1/1973 | van Nobelen | |
| 3,726,041 A | | 4/1973 | Ota et al. | |
| 3,782,033 A | | 1/1974 | Hickerson | |
| 4,020,881 A | * | 5/1977 | Nothen | 141/1 |
| 4,363,341 A | | 12/1982 | Powell | |
| 4,697,623 A | * | 10/1987 | Bouldin et al. | 141/80 |
| 5,641,008 A | * | 6/1997 | Ellis | 141/129 |
| 6,435,228 B1 | * | 8/2002 | Van Voorthuizen et al. | 141/129 |
| 6,594,949 B2 | * | 7/2003 | Ellis | 47/1.01 P |

* cited by examiner

*Primary Examiner* — Timothy L Maust
*Assistant Examiner* — Brandon J Warner
(74) *Attorney, Agent, or Firm* — Egbert Law Offices, PLLC

(57) ABSTRACT

A potting apparatus has a first conveyor suitable for receiving a pot thereon, a second conveyor has a surface suitable for receiving soil thereon and having an end positioned so as to deliver soil to the pot on the first conveyor, a drill positioned above the first conveyor so as to be movable upwardly and downwardly relative to the pot on the first conveyor so as to form a hole in the pot, and a driving means cooperative with the first conveyor for moving the first conveyor in an indexing manner such that the first conveyor temporarily stops at a location directly below the drill. The drill is slidably supported on a frame so as to be driven by a belt connected to the drill. A servomotor is drivingly connected to the belt so as to move the drill in an upward direction or a downward direction.

13 Claims, 5 Drawing Sheets

POTTING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to machines and processes which assist in plant potting operations. In particular, the present invention the relates to potting machines whereby the pots are moved along a conveyor so that a drilling operation can be performed on the soil within the pot.

2. Description of Related Art Including Information Disclosed Under 37 CFR 1.97 and 37 CFR 1.98.

Horticultural growers have a need to periodically place growing plants (e.g., seedlings, shrubs, flowers, and the like) in pots of sufficient size so as to accommodate future growth. Once the potted plants have attained a desired size, they can be sold to retail nurseries, landscape companies or the like for transplanting to a permanent site.

Potting machines which assist the horticultural growers in placing their plants into soil-containing pots are well known. In this regard, most potting machines include a soil infeed conveyor which transfers potting soil from a soil supply to a soil lift conveyor which elevates the soil over and into pots traveling along a closed-loop pot track.

The prior art potting machines require a great deal of mechanical adjustments in order to properly drill the hole in the soil within the pot. As such, in order to change the depth of a drill, the machine must be stopped and the drill must be mechanically adjusted. In certain circumstances, the drill must be adjusted in order to achieve the requisite depth. Furthermore, under circumstances the drilled holes can be off center of the pot. As such, an adjustment of the pot holding mechanism will be necessary in order to properly place the drill in a centered position relative to the soil. Otherwise the positioning of the pot holding mechanism must be adjusted so as to center the pot below the drill.

The mechanisms associated with such prior art potting apparatus involve a large number of linkages and mechanical connections. Over time, these linkages and mechanical connections can become worn. As a result, the potting apparatus will work in a rather jerking manner. Whenever the machine is vibrating or jerking, there is a likelihood of pots being displaced, of soil being dislodged, and of ineffective hole drilling.

In the past, many such potting apparatus have included a circular track whereby the soil is loaded, compacted, and drilled. The centrifugal force caused by such circular tracks often causes the pots to assume an oblong configuration and tends to cause soil to be flung out of the pot. Often, an uneven layer of soil is the result of such centrifugal force affecting the pot conveying system.

Additionally, in the past, various fixtures were necessary to accommodate various sizes of pots. Generally, in such potting processes, the pot can be of a five gallon size or be as large as up to a twenty-five gallon size. These fixtures in prior art potting machines must be changed so as to accommodate the different sizes of such pots. Additionally, the various compacting and drilling operations must also be manipulated so as to accommodate the different sizes of pots.

Further, the prior art potting machines also include a large variety of mechanical linkages. It is known that, over time, such linkages can become worn and damaged. Continual repair of such a potting apparatus is necessary so as to meet the demands for the production of potted plants. Also, typically, the drilling operation on such a pot is a relatively ineffective process. The pot must be placed below the drill and then the drill lowered from an elevated location downwardly into the soil so as to drill the hole. The drill must be placed at a relatively high location so as to accommodate large size pots and have a considerable length of travel in which to reach the drilling location.

In the past, various patents have issued relating to potting apparatus. For example, U.S. Pat. No. 3,657,839, issued on Apr. 25, 1972 to B. Krause, shows an apparatus for the potting of plants. A hollow drum is mounted for rotation about a substantially horizontal axis and in its opposite axial ends are provided with respective center openings through one of which particulate potting material is introduced in flowable state. A feed introduces through the other of the openings sequentially upwardly open potting containers which are subsequently withdrawn from this other opening. A rotating means rotates the drum about its axis and entraining blades interior of the drum continuously entrain and lift the potting material upwardly of the potting containers so that it cascades over and into them.

U.S. Pat. No. 3,713,465, issued on Jan. 30, 1973 to A. H. van Nobelen, describes a device for filling flower pots with earth. The device has a vessel for receiving an earth supply, a conveyor for moving a number of pots towards and from the location where the filling occurs, and means for raising the earth from the vessel to above the plane of the pot-conveyor. An upright side of the supply vessel is formed by a side of a vertically extending endless conveyor enclosing an acute angle with respect to the bottom plane of the vessel. The bottom of the vessel is the upper side of a belt conveyor and a channel is provided at the point where the conveyors meet.

U.S. Pat. No. 3,726,041, issued on Apr. 10, 1973 to Ota et al., describes an apparatus for filling and packing soil. The apparatus includes means for compressing the soil in the containers by pressing the lower lap of a conveyor belt downwardly thereon.

U.S. Pat. No. 3,782,033, issued on Jan. 1, 1974 to N. E. Hickerson, shows a pot filling and compacting apparatus and method. Spilled soil is collected and returned to a hopper for re-use. A punch is provided for driving a hole in the soil in the pot.

U.S. Pat. No. 4,020,881, issued on May 3, 1977 to G. Nothen, describes the automatic filling of flower pots. The machine has a horizontally-moving conveyor on which empty pots are magazine-deposited, for intermittent movement, so as to pass successively to a station at a funnel-like earth filling device, to a station at a leveling device, and to a station at a hole drilling device. The hole drilling device produces a conical, plant-ball receiving hole. The conveyor accepts pots in rows and columns.

U.S. Pat. No. 4,363,341, issued on Dec. 14, 1982 to C. F. Powell, teaches a plant container filling machine. A pair of synchronized rotating bladed wheels dispense soil from a hopper into flats of pots moving on a conveyor in a coordinated manner beneath the wheels. The hopper is vibrated by impingement of the wheel blades against the lower portion of the hopper. The containers are agitated by movement of a frame against the conveyor underside.

U.S. Pat. No. 4,697,623, issued on Oct. 6, 1987 to Bouldin et al., provides an apparatus for continuously filling and preparing pots for receiving plants. This apparatus has an endless conveyor chain supporting a plurality of pot receiver elements and for continuously carrying pots from a pot loading station through a filling station for filling the pots with potting soil. The conveyor moves to a pot drilling station for drilling holes in the soil and then to a pot ejector station. The pots are loaded, filled, drilled, and ejected while the pots move continuously through the various stations. The pot drilling mechanism includes a rotary turret supporting a plurality of circumferentially-spaced rotating drills which are adapted to reciprocate vertically as they revolve about the rotary axis of the turret so that each drill will be lowered into a pot for drilling a hole in the soil while moving at the same speed and direction as the pot. Rotary pot loading and ejecting mechanisms are incorporated to move in synchronism with the conveyor chain for loading the pots individually upon the apparatus and for individually ejecting the pots after they are filled and drilled.

U.S. Pat. No. 5,641,008, issued on Jun. 24, 1997 to the present inventor, discloses a potting machine having a pot track for sequentially conveying plant pots along a potting path. A soil lift conveyor having a soil discharge chute lifting soil above the pot track and discharges the soil through the soil discharge chute and into those plant pots on the pot track positioned in the potting path therebelow. A soil infeed conveyor conveys the soil from a source thereof to the soil lift conveyor. The soil flow rate between the infeed and lift conveyors is synchronized by a chain-and-sprocket synchronizer. A soil flow-control motor connected to the chain-and-sprocket synchronizer continuously drives the same so that the soil infeed and lift conveyors respectively feed and lift soil in a continuous synchronous manner to thereby effect control over the flow of soil from the soil source to the discharge chute. The potting machine has coordinated indexing and soil drilling assemblies so as to respectively advance the plant pots along the potting path and drill a recess in the soil deposited into the plant pots by the lift conveyor.

U.S. Pat. No. 6,594,949, issued on Jul. 22, 2003 also to the present inventor, shows a potting machine that has a synchronized continuous motion pot track and soil drilling systems. A soil-filled pot is moved continuously along a linear segment of a pot track. A drill bit is moved continuously in synchronized registry with the soil-filled pot at the same time as the pot moves continuously along the linear segment of the pot track. Simultaneous horizontal and vertical motion components are imparted to a soil-drilling drill bit relative to the linear segment of the pot track by moving the drill bit in an arcuate orbit above the pot track. Since such simultaneous horizontal and vertical motion components cause the drill bit to track linearly in registry with the pot conveyed by the pot track along the linear segment thereof and to be moved vertically into and out of contact with soil contained within the pot to thereby drill the planting recess therein.

It is an object of the present invention to provide a potting apparatus that provides a common drilling depth for the soil in pots passing therethrough.

It is another object of the present invention to provide a potting apparatus which avoids deformed drilled holes due to a lack of centrifugal force on the pots, as is common in the prior art.

It is another object of the present invention to provide a potting apparatus which speeds up the potting process.

It is still a further object of the present invention to provide a potting apparatus that is adaptable to different sizes of pots.

It is a further object of the present invention to provide a potting apparatus which avoids the use of fixtures and other retainers for the pots and also avoids any toppling of the pots while on the conveyor.

It is a further object of the present invention to provide a potting apparatus that maximizes the use of soil.

It is still another object of the present invention to provide a potting apparatus which avoids the need for accurate spacing of the pots along the conveyor.

It is still another object of the present invention to provide a potting apparatus which avoids mechanical linkages so as to improve the reliability of the potting operation.

These and other objects and advantages of the present invention will become apparent from a reading of the attached specification and appended claims.

BRIEF SUMMARY OF THE INVENTION

The present invention is a potting apparatus that comprises a first conveyor suitable for receiving a pot thereon, a second conveyor having a surface suitable for receiving soil thereon and having an end positioned so as to deliver soil for the pot on the first conveyor, a drill positioned above the first conveyor so as to be movable upwardly and downwardly relative to the pot on the first conveyor so as to form a hole in the soil of the pot, and a driving means cooperative with the first conveyor for moving the first conveyor in an indexing manner such that the first conveyor temporarily stops at a location directly below the drill.

The potting apparatus includes a hopper positioned at an opposite end of the second conveyor. The hopper is suitable for receiving soil therein. The second conveyor is suitable for moving the soil from the hopper. The second conveyor is positioned in a channel. The second conveyor has a chain with bars extending across a portion of the channel The bars are in generally spaced parallel relation to each other.

The first conveyor is a belt conveyor having a loading station at one end thereof. The belt conveyor has an upper surface suitable for receiving the pot thereon at the loading station.

A sweeping means is positioned upstream of the drill. The sweeping means is for sweeping soil extending above a top of the pot. The sweeping means includes a shaft, at least one arm extending radially outwardly of the shaft adjacent a lower end of the shaft, a brush affixed to the arm and extending downwardly therefrom, and a means for driving a shaft in rotation.

The drill is slidably supported on a frame. A belt is connected to the drill. A servomotor is drivingly connected to the belt so as to move the drill in an upward direction or a downward direction. A packing plate is resiliently positioned in relation to the drill. The packing plate has a diameter equal to or greater than a diameter of pot. The packing plate has an aperture formed therein. The drill is positioned so as to be extendable through the aperture when the drill forms a hole in the soil of the pot. A sensor means is positioned upstream of the drill for sensing when the pot is directly below the drill.

The first conveyor has a discharge end downstream of the drill so as to allow the pot to be removed from the first conveyor. A plurality of shafts are positioned downstream of the discharge end of the first conveyor. The plurality of shafts are arranged in spaced parallel relationship. The plurality of shafts have roller members affixed thereto. The potting apparatus includes a means for rotating the plurality of shafts so as to cause the pot thereon to move therealong. A bin is positioned below the plurality of shafts so as to receive residual soil from the first conveyor as passed through the plurality of shafts. An auger extends into the bin so as to move the residual soil from the bin back to the second conveyor.

The driving means serves to move the first conveyor from another location to the location directly below the drill and operates in a pattern which slowly speeds up from the another location and which slowly speeds down at the location directly below the drill. A maximum speed is achieved by the driving means between the locations. The first conveyor extends in a direction transverse to the second conveyor.

The present invention is also a process for potting that comprises the steps of: (1) placing a pot on a first conveyor adjacent one end thereof; (2) introducing soil into the pot such that the soil fills the pot to a desired height; (3) indexing the first conveyor so as to move the soil-introduced pot to a location directly below a drill; (4) drilling a hole with the drill into the soil of the pot when the pot is at the location; (5) moving the drilled-soil pot on the first conveyor to a discharge station; and (6) removing the pot from the discharge station.

The step of indexing includes increasing the speed of movement of the first conveyor from the stop position such that a maximum speed occurs at another location away from the stop position, and decreasing the speed of the movement of the first conveyor from the another location until the conveyor stops at the location directly below the drill. A packing plate is resiliently moved downwardly toward a top of the pot. The drill is lowered downwardly through an aperture formed in the packing plate. The process also includes the step of sweeping soil that extends above a top of the pot prior to the step of drilling.

The foregoing "Summary of the Invention" is intended to describe the preferred embodiment of the present invention and, as such, should not be construed as limiting the scope of the present invention. The scope of the present invention should be defined by the claims herein. This Summary of the Invention should not be limiting of the various forms of the present invention that would be encompassed by the present claims.

DETAILED DESCRIPTION OF THE INVENTION

Figure 1:
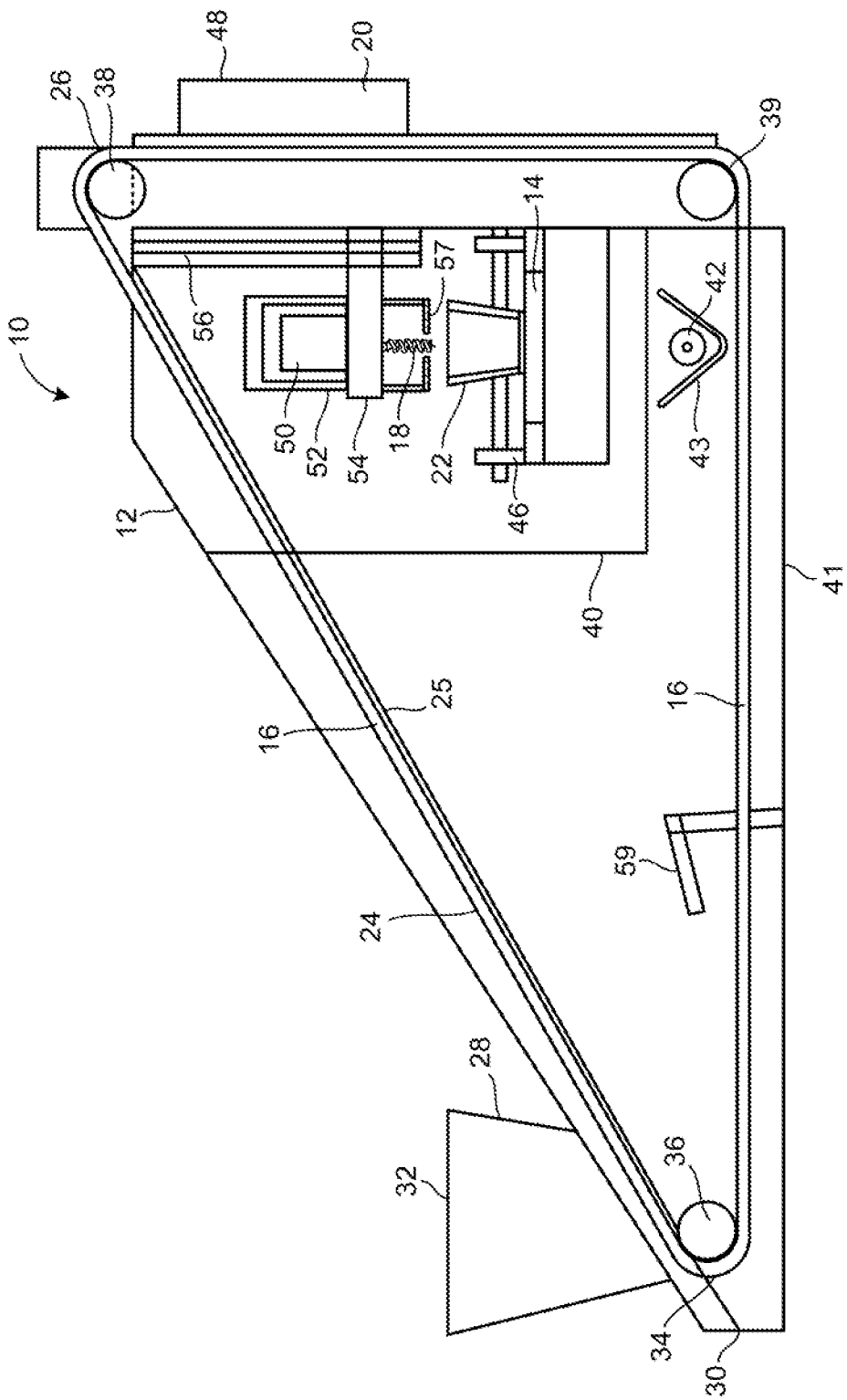
FIG. 1 is a side elevational and partially transparent view of the potting apparatus in accordance with the preferred embodiment of the present invention.

Referring to FIG. 1, there is shown the potting apparatus 10 in accordance with the preferred embodiment of the present invention. The potting apparatus 10 includes a housing 12 having a first conveyor 14 positioned within the housing 12, a second conveyor 16, a drill 18, and a driving means 20. The first conveyor 14 is a belt conveyor suitable for receiving a pot 22 thereon. The second conveyor 16 has an area 24 suitable for receiving soil thereon and therein and for moving the soil along the interior of a channel 25 located within the housing 12. The second conveyor 16 has an end 26 positioned so as to deliver soil into the pot on the first conveyor 14. The drill 18 is positioned above the first conveyor 14. The drill is movable upwardly and downwardly relative to the pot on the first conveyor 14 so as to form a hole in the soil in the pot 22. The driving means 20 is a servomotor that is cooperative with the first conveyor 14 for moving the first conveyor 14 in an indexing manner such that the first conveyor 14 temporarily stops at a location directly below the drill 18.

Figure 2:
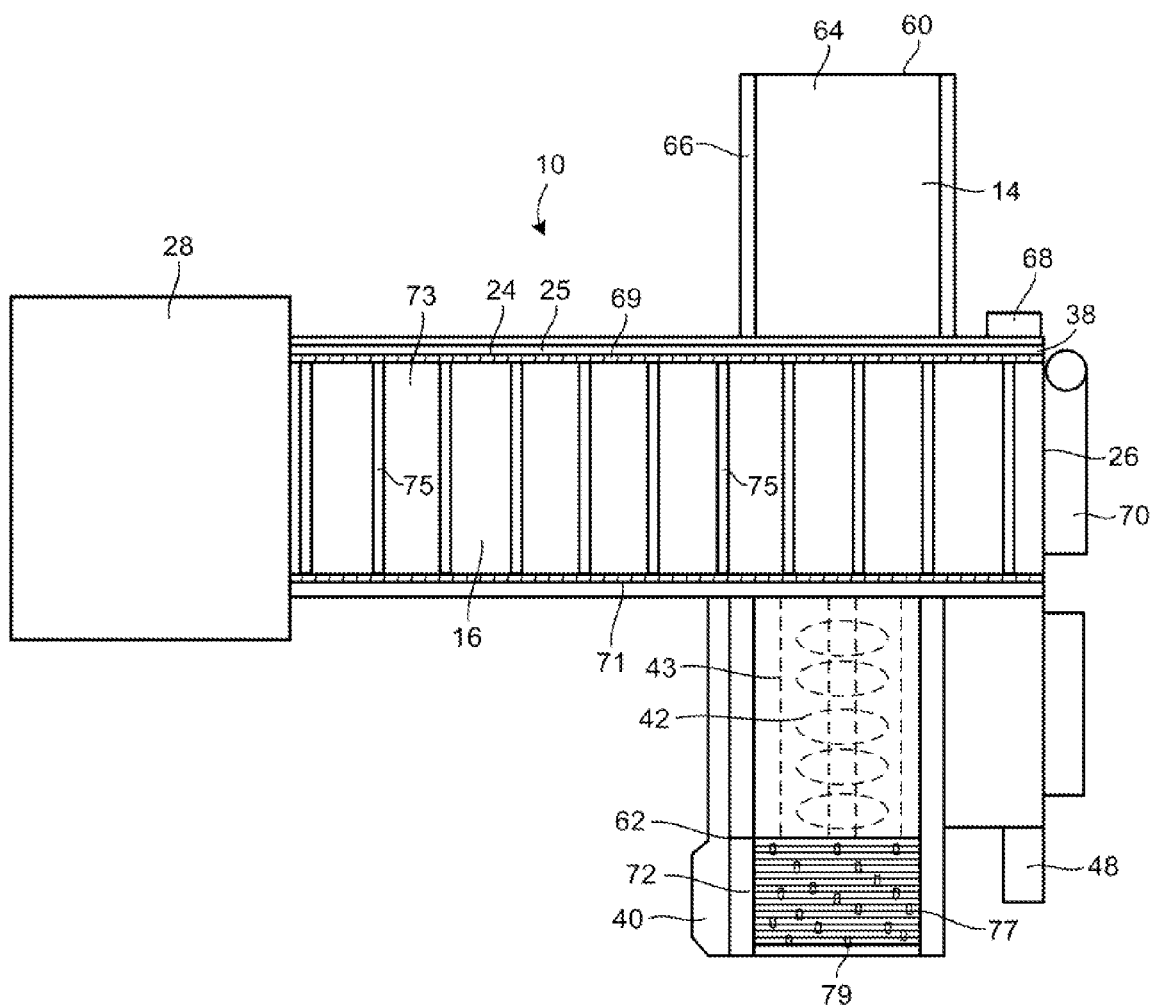
FIG. 2 is a plan view of the potting apparatus in accordance with the teachings of the present invention showing, in particular, in broken line fashion, the auger.

As can be seen in FIG. 1, there is a hopper 28 that is positioned adjacent to an end 30 of the housing 12. The hopper 28 has an open top 32 that is suitable for receiving soil therein. The hopper 28 is disposed over the second end 34 of the second conveyor 16 so as to deliver soil to the second conveyor 16. The second conveyor 16 is in the nature of a soil elevator chain conveyor. In other words, there are chains that extend along the channel 25 with bars extending thereacross. A detailed illustration of such a conveyer is illustrated in FIG. 2. However, within the concept of the present invention, various types of conveyors can be utilized so as to properly deliver the soil from the hopper 28 upwardly toward the first end 26 positioned above the first conveyor 14.

The second conveyor 16 is in the nature of an endless belt conveyor that extends around sheaves 36, 38 and 39. At least one of the sheaves 36, 38 and 39 are driven by a motor so as to cause the conveyor 16 to move along the channel 25 from the hopper 28 toward the end 26. Additionally, the sheaves 36, 38 and 39 cause the second conveyor 16 to be driven in a direction generally in parallel relationship to the bottom 41 of the housing 12. This portion of the second conveyor 16 adjacent the bottom 41 of the housing 12 can also be moving through a suitable channel so as to transport the soil back to a location below the hopper 28. When the soil from the hopper 28 is delivered onto the conveyor 16, it will be transported upwardly at an approximately 45° angle so as to be delivered off of the upper end 26 of the conveyor 16. It can then be discharged into a suitable soil delivery channel and delivered into a pot on the first conveyor 14.

The first conveyor 14 is a linear belt conveyor. This belt conveyor has a generally flat upper surface that does not have fixtures or pot-receiving structures thereon. The first conveyor 14, as illustrated in FIG. 1, has its end adjacent to a bin 40 located therebelow. As such, any residual soil that may remain on the first conveyor 14 can be delivered through a suitable grating and into the bin 40. The grating can be in the nature of a series of shafts arranged in parallel relationship. A suitable auger 42 extends into the interior of the bin 40 and will be located within another channel 43. As such, any residual soil that might fall into the bin 40 from the first conveyor 14 can be delivered by the auger 42 back onto the second conveyor 16 for delivery back to the hopper 28 and for reuse within the process of the potting apparatus 10 of the present invention. A suitable motor can be utilized so as to drive the auger 42. Alternatively, the auger 42 can be slave-driven by the motor which rotates one of the sheaves 36, 38 and 39 that are associated with the second conveyor 16.

Importantly, it can be seen that there is a pot-adjusting mechanism 46 positioned adjacent to the sides of the first conveyor 14. The pot-adjusting mechanism 46 can be in the nature of a guide in which both sides of the guide can extend inwardly so as to generally match the diameter of the pot 22. The adjustment of the pot-adjusting mechanism 46 can be carried out automatically so as to conform with the size of pot that is delivered along the first conveyor 14. It can be seen that the pot-adjusting mechanism 46 has a rod which extends inwardly so as to contact the periphery of the pot 22 so as to generally center the pot 22 in a location directly below the drill 18. The pot-adjusting mechanism 46 assures that the system of the present invention is able to adapt to various sizes of pots that might be passed along the first conveyor 14. The pot-adjusting mechanism 46 of the present invention represents a significant improvement over the prior art machines wherein the numerous pot holders have to be changed out when switching between different sizes of pots. The switching-out of the pot holders of the prior art is a very time-consuming process. Further, when filling larger pots with machines of the prior art, an empty pot holder needed to be placed between adjacent larger pots, thereby reducing the efficiency of the potting machine.

As will be described hereinafter, the first conveyor 14 is driven by a servomotor. The servomotor is suitably programmable by automatic controls in the housing 48 to control the braking and pattern of movement of the first conveyor 14. As such, the first conveyor 14 can be adapted to the capacity of the apparatus 10 in terms of the size of pot that is being introduced, the rate at which the soil is being introduced into the pots, and the rate of drilling of the soils in each of the pots. Importantly, the servomotor associated with the first conveyor 14 has a unique drive in which the conveyor 14 is suitably indexed so that the various pots 22 can be stopped at a location of a particular operation. As such, as can be seen in FIG. 1, the pot 22 is stopped temporarily in a location below the drill 18. As a result of this stopping, the proper drilling of the soil within the pot 22 can occur. Once the drilling operation is complete, the drill 18 will rise upwardly and the pot 22 can be driven to a discharge station.

It has been found that a rapid acceleration of the first conveyor 14 between its various stops could potentially cause a toppling of the pot 22. In order to avoid this problem, the servomotor serves to drive the first conveyor 14 such that the first conveyor 14 ramps up its speed slowly from the stop position and then decelerates slowly toward another stop position. As such, the first conveyor 14 is able to rapidly transfer the various pots 22 between the various stations without the risk of the toppling of the pots.

The drill 18 has its drilling motor 50 maintained within a frame 52 and supported upon a panel 54. The motor 50 can be controlled by controls within the housing 48 so as to effect the proper rate of drilling and the proper patter of up-and-down movement. The frame 52 is illustrated as being supported upon an upright pair of rods 56. Rods 56 form a direction of travel for the drill 18. When it is desired to drill the soil within the pot 22, the servomotor within the housing 48 will cause the drill 18 to move downwardly along the pair of rods 56 so that the drill 18 enters and drills the soil within the pot 22. The servomotor and suitable controls within the housing 48 can be suitably adjusted so that the bottom end of the drill 18 is only slightly above the height of the pot 22. Within the concept of the present invention, this height can be in the range of one to two inches. As such, a long travel path is avoided for the drill 18. When the pot 22 is in a position below the drill 18, the drill will only have to move a small distance in order to carry out the drilling procedure. After drilling is completed, the drill 18 can move upwardly so that the next pot can be moved to the station directly below the drill 18.

Through the concept of the present invention, the stroke of drill can be changed on the fly. If it should appear that the drill is forming a hole that is off-center, then the electronics associated with the present invention can adjust the drill in both the x and y axes in order to center the drill perfectly relative to the soil. In particular, through proper automation, the pot-adjusting mechanism 46 can be cooperative with the control so that an automatic centering can always occur. The drill 18 can be a single drill or it can be adapted to gang drilling. The structure of the present invention serves to minimize any wear-and-tear associated with the various components. As such, even after continual and extended use, the apparatus 10 will work smoothly and will avoid any vibrations or jerking that can occur through the wear-and-tear of the components.

In FIG. 1, it can be seen that there is a packing plate 57 that is positioned adjacent to the drill 18. The packing plate 57 is resiliently mounted relative to the drill 18. As such, when the drill 18 is lowered toward the top of the pot 22, the underside of the packing plate 57 will contact the upper edges of the pot 22. This serves to pack the soil within the pot 22, to even the soil with the rim of the pot 22, and to center the drill 18 relative to the pot 22. The packing plate 57 has an aperture formed in the center thereof. As such, when the drill 18 is lowered toward the pot 22, the packing plate 57 will be maintained in a constant position as the drill 18 is lowered through the aperture of the packing plate 57.

FIG. 1 shows that there is a scraper 59 positioned at the bottom 41 of the housing 12. Scraper 59 overlies the top surface of the second conveyor 16 as its travels from the sheave 39 toward the sheave 36. The scraper 59 assures that a relatively level amount of soil is delivered back toward the hopper 28. The scraper 59 is vertically adjustable.

FIG. 2 is plan view of the potting apparatus 10 of the present invention. In FIG. 2, it can be seen that the conveyor 14 is a linear belt-type conveyor that extends from a loading end 60 to a discharge end 62. The conveyor belt 64 is mounted on a series of idlers positioned on a frame 66. As such, the frame 66, along with the conveyor belt 64, establishes the linear path of travel of the conveyor belt 64.

The hopper 28 is illustrated as located at an end of the second conveyor 16. As such, hopper 28 is in a suitable position for delivering the soil onto the second conveyor 16. Motor 68 is drivingly connected to the sheave 38 so as to cause the driving of the second conveyor 16.

In FIG. 2, it can be seen second conveyor 16 is a variable-speed chain conveyor. An endless chain 69 will travel along one side of the channel 25. Similarly, another endless chain 71 will travel along another side of the channel 25. The bottom 73 of the channel 25 will be generally flat and positioned adjacent to the endless chains 69 and 71. A plurality of bars 75 will extend transversely between the endless chain 69 and 71 in generally spaced parallel relationship. As such, the bars 75, in cooperation with the bottom 73 of the channel 25 will cause the soil to move along the channel 25 toward the discharge end 26 of the second conveyor 16.

A control panel 70 is located adjacent to the motor 68 so as to control the operation of the various motors associated with the apparatus of the present invention. The control panel 70 can be a suitable control panel for programmable logic control of the various servomotors and other motors associated with system of the present invention. The servomotor 48 for the drill 18 is illustrated as positioned to a side of the first conveyor 14.

A plurality of shafts 77 are arranged in spaced parallel relationship adjacent to the discharge end 62 of the first conveyor 14. A plurality of roller members are affixed in various locations along the plurality of shafts 77. The plurality of shafts 77 can be slave-driven by a suitable driving means so as to rotate at a desired rate. As such, as the pot travels along the first conveyor 14, it will be passed from the discharge end 62 of the first conveyor 14 onto the plurality of roller members 79 associated with the plurality of shafts 77. Any residual soil that remains on the surface of the first conveyor 14 can be discharged through the spaces formed between the plurality of shafts and downwardly into the bin located therebelow.

A suitable auger mechanism 42 is positioned in the channel 43. The auger mechanism 42 extends from the bin 40 so as to cause any residual soil that passes through the spaces between the plurality of shafts 77 to move along the channel 43 back toward the second conveyor 16. As such, such residual soil will be delivered onto the second conveyor 16 adjacent to the bottom 41 of the housing 12. As such, the second conveyor 16 can return the residual soil back toward the area below the hopper 28.

In use, a worker can place an empty pot upon the first conveyor 14 at the loading station 64. The first conveyor 14 will move in an indexed manner so as to bring the empty pot to a soil delivery channel so that the soil can be introduced from the second conveyor 16 into the pot. Ultimately, after drilling, the filled and drilled pot will pass to the discharge station 72. At the discharge station 72, the worker can remove the filled and drilled pot so as to complete the process of the potting apparatus 10.

Figure 3:
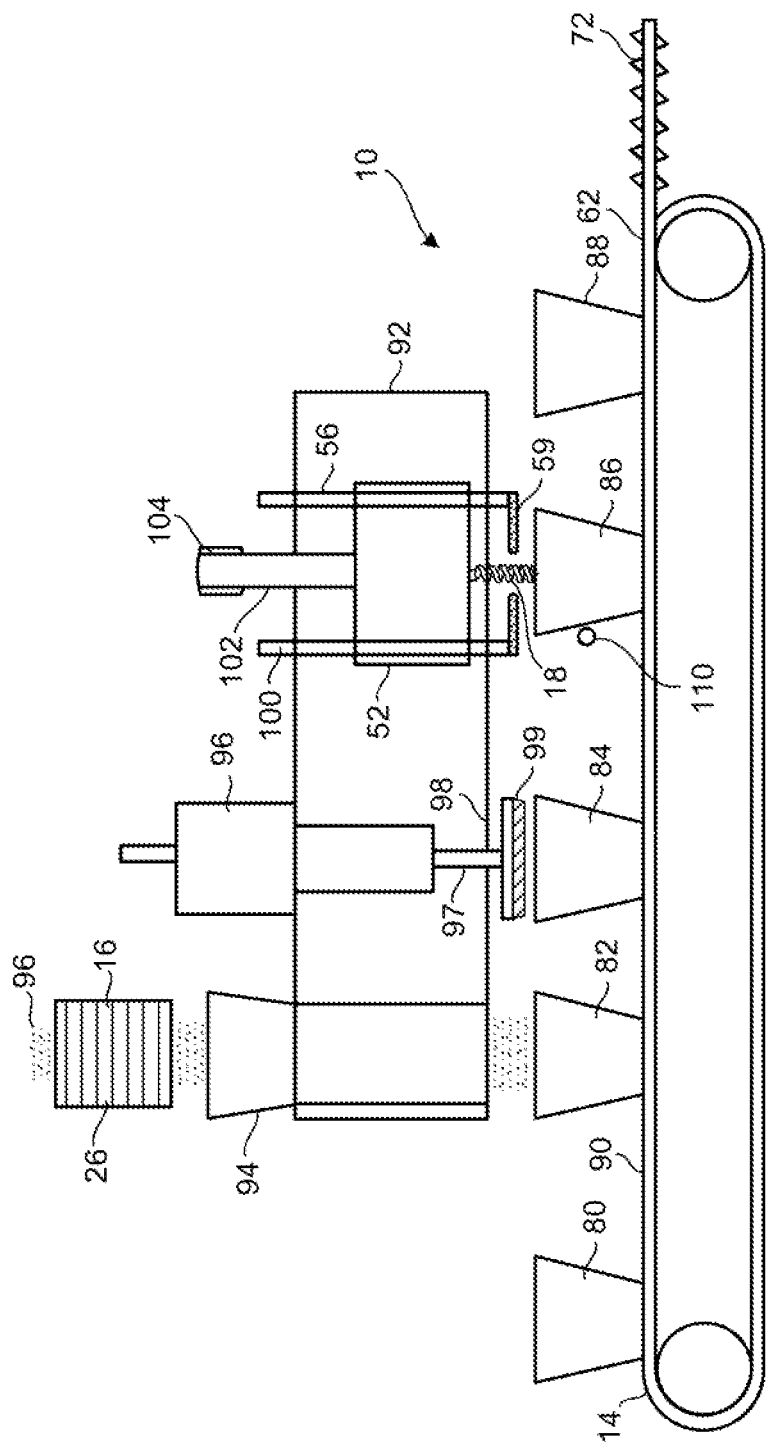
FIG. 3 is a frontal view showing the various steps in the process of potting as used in the present invention.

FIG. 3 shows the operations associated with the potting apparatus 10 of the present invention. There are a total of five pots 80, 82, 84, 86 and 88 that are illustrated as positioned on the top surface 90 of the first conveyor 14. A frame 92 is located above the conveyor 14 so that the various operations can be carried out.

As can be seen, the second conveyor 16 has its discharge end 26 located above the soil delivery channel 94. As such, the soil 96, as located on the second conveyor 16 will be discharged into the soil delivery channel 94 and will pass downwardly so as to be discharged into the open top of the pot 82. A sweeping mechanism 96 is provided downstream of the soil delivery channel 94. The sweeping mechanism 96 can take on a wide variety of configurations. In FIG. 3, the sweeping mechanism 96 includes a suitable motor that can rotate a shaft 97 so as to cause the brush 99 to sweep the accumulation of soil extending above the top of the pot 84. As such, the soil that will remain above the top surface of the pot 84 will be suitable for packing The brush 99 should be located approximately one to two inches above the top of the pot 84.

Figure 6:
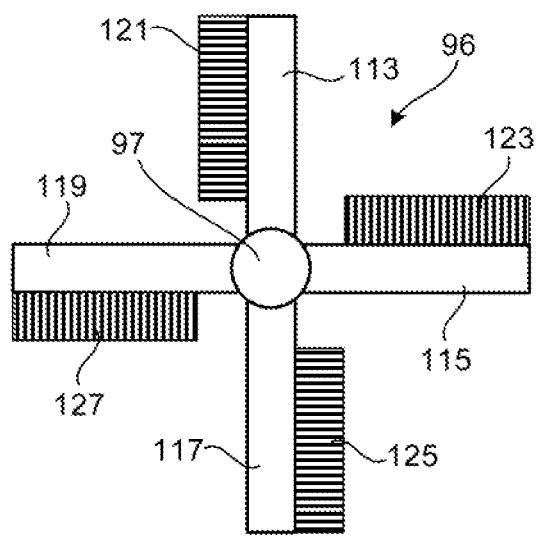
FIG. 6 is an isolated plan view showing the sweeper of the present invention.

Unlike the prior art, the sweeping mechanism 96 replaces previous scraper devices. The rotary action of sweeping the soil, rather than scraping, assures that the pot 84 will remain upright. If a scraping mechanism would be utilized, then it would be possible, when dense soil is placed into the pot 84, the scraper could cause a toppling of the pot 84. As such, the sweeping mechanism 96 gently sweeps the mound of soil so as to avoid any possible toppling of the pot 84. The particular illustration of the brush 99 is illustrated in FIG. 6 herein. The sweeping mechanism is height-adjustable so as to conform with various sizes of pots 84. The sweeping mechanism is ultimately necessary because no pot holder is used in association with the first conveyor 14.

The drill 18 is located above the pot 86. As can be seen, the frame 52 supporting the motor of the drill 18 is placed upon rods 56 and 100. Rods 56 and 100 define a path of travel of the drill 18. Each of the rods 56 and 100 serve as bearing surfaces for the movement of the drill 18. Ultimately, a belt 102 is attached to the frame 52 of the drill 18 so as to cause this movement of the drill 18 between an upward and a downward position. A suitable sheave or pulley 104 serves to maintain the belt 102 in a desired location. A driven pulley will be driven by the servomotor. The servomotor is connected to an end-line gearbox. A shaft is connected to the gearbox. Ultimately, the shaft is coupled to the pulley so as to drive the belt 102 in a controlled manner.

When the electronic eye or limit switch 110 senses that the pot 86 is in a position below the drill 18, the conveyor 14 will position the pot below the drill and will stop temporarily so that the drilling operation can be completed. The servomotor 108 will lower the drill 18 and a packing plate 59 such that the packing plate 59 will contact the soil that extends above the top edge of the pot 86 and compacts the soil therein. Once the packing plate 59 contacts the top edge of the pot 86, the drill 18 is continuously moved downwardly so as to complete the drilling operation to a desired depth. After the drilling operation is completed, the drill 18 will move upwardly, along with the resiliently-mounted packing plate 59. It can be seen that the drill 18 will extend through the aperture located at the center of the packing plate 59. The resilient mounting of the packing plate 56 assures a continual operation as the drill 18 is moved upwardly and downwardly.

After the drilling operation is completed, the pot 86 will move onward. The filled and drilled pot 88 is illustrated as located at the discharge station 62. As such, the filled and drilled pot 88 will move onto the roller members and shafts 72 adjacent to the discharge station 62. Any residual soil on the surface of the conveyor 14 will pass through the spaces between the shaft 72 for discharge to the bin therebelow.

Figure 4:
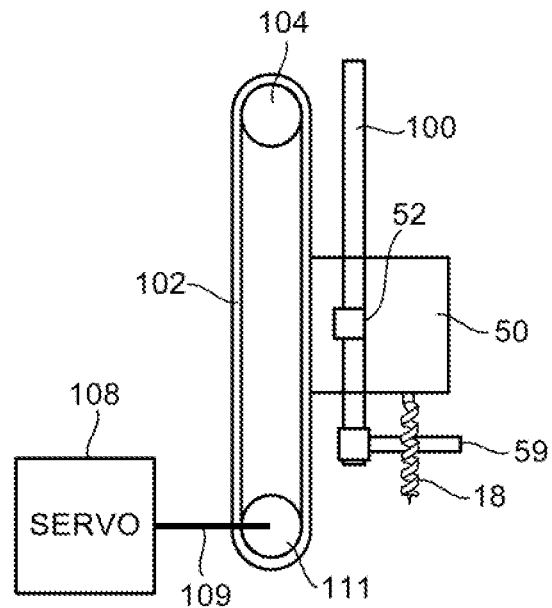
FIG. 4 is a detailed view showing the operation of the drill in accordance with the teachings of the present invention.

FIG. 4 is a detailed view of the drilling mechanism. As can be seen, the drill 18 is connected to the drill motor 50. The frame 52 receives the rod 100 therein. Rod 100 (along with rod 56) defines a path of vertical travel of the drill 18. The belt 102 in the form of an endless belt, is connected to the frame 52 or the motor 50 so as to cause the upward and downward movement of the drill 18 with respect to the rod 100. As used herein, the term "belt" can refer to a wide variety of similar configurations, including chains, ropes and similar structures.

The servomotor 108 is connected by a shaft 109 to the driven pulley 111 so as to cause the controlled movement of the belt 102. For a large pot, the length of travel of the drill 18 relative to the rod 100 will be rather great. For smaller pots, the drill 18 will be placed in a lower position along the rod 100 so that it can be very close to the soil within the pot. When the limit switch or electronic eye 110 senses that the pot is directly below the drill 18, the servomotor is activated so as to move the drill 18 along with the packing plate 59 downwardly. The packing plate 59 is illustrated as resiliently interconnected to the rod 100 or the motor 50 such that the packing plate 59 will move toward the motor 50 will the drill is being lowered and the packing plate 59 has compacted the top edge of the pot. As such, the present invention is able to achieve drilling in a controlled and effective manner.

Figure 5:
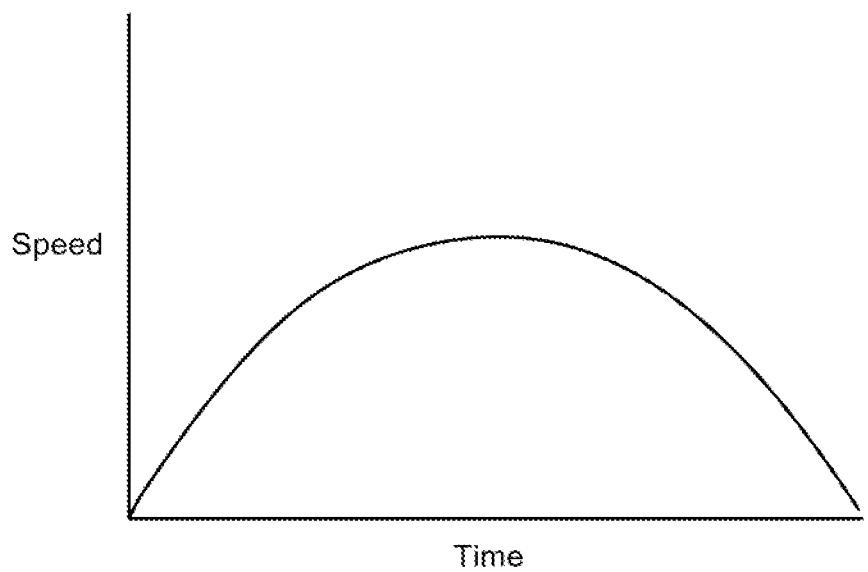
FIG. 5 is a graph showing the pattern of moving the conveyor during the indexing of the conveyor from one position to another position.

As stated previously, the movement of the conveyor 14 is important in order to allow the various pots to be placed on the surface of the conveyor without the need for fixtures or other retaining devices. If the conveyor 14 is abruptly started and accelerated, or abruptly stopped, there is a possibility of the pot toppling on the conveyor. As such, it is necessary to control the rate at which the conveyor accelerates and decelerates during the movement between the various stations along the conveyor. FIG. 5 shows that the speed of the conveyor belt slowly increases from the initial start position, reaches a maximum speed between the start and stop positions, and then slowly decelerates toward the stop position. It has been found that this pattern of movement is very effective in properly maintaining the pot on the surface of the first conveyor belt 16. As such, the present invention avoids any possible toppling of the pots. Additionally, this approach eliminates the need for the use of pot holders on the conveyor belt.

FIG. 6 is a plan view showing the brush mechanism 96 of the present invention. The brush mechanism 96 includes a shaft 97 that can be driven by a suitable motor and/or slave-driven. A plurality of arms 113, 115, 117 and 119 extend radially outwardly from the shaft 97 at a lower end thereof. A plurality of brushes 121, 123, 125 and 127 extend downwardly from the respective arms 113, 115, 117 and 119. As such, the rotation of the shaft 97 will cause a gentle and even sweeping of the soil which extends above the top of the pot. This mechanism avoids the use of any scraping mechanism, such as used in the prior art.

Figure 7:
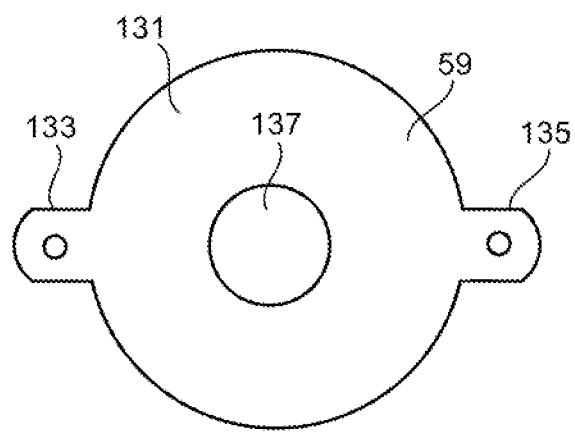
FIG. 7 is an isolated view of the packing plate of the present invention.

FIG. 7 is a plan view showing the packing plate 59. The packing plate 59 has a generally planar circular surface 131 having a diameter equal to or greater than the diameter of the pot. As such, when the packing plate 59 is suitably lowered, it will have a surface that will certainly contact the upper edges of the pot. Ears 133 and 135 extend radially outwardly of the periphery of the planar surface 131. Ears 133 and 135 allow for the resilient mounting of the packing plate 59. A central aperture 137 is formed centrally of the planar surface 131. Aperture 137 has a diameter suitable for allowing the drill 18 to pass therethrough.

Figure 8:
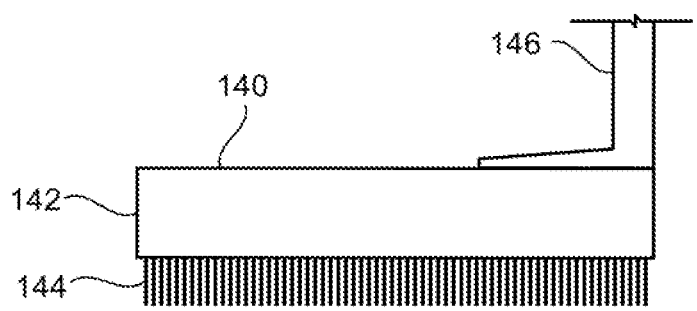
FIG. 8 is an isolated view of a brushing mechanism optionally used in flat fill operations with the potting apparatus of the present invention.

FIG. 8 is an isolated view of a brushing mechanism 146 which may be used in flat fill operations with the present invention. In flat fill operations, the brushing mechanism may be attached inline with the various other mechanisms of the potting apparatus 10, downstream of the soil delivery channel 94 (as shown in FIG. 3). Alternatively, the brushing mechanism may be a permanent fixture on the potting apparatus 10. The brushing mechanism has an arm 146 and a housing 142. A rotary brush 144 if affixed within the housing 142. During flat fill operations, the brushing mechanism 146 serves to remove excess soil placed atop the flat.

The foregoing disclosure and description of the invention is illustrative and explanatory thereof. Various changes in the details of the illustrated construction, or in the steps of the described method, can be made within the scope of the appended claims without departing from the true spirit of the invention. The present invention should only be limited by the following claims and their legal equivalents.

I claim:

1. A potting apparatus comprising:
    a first conveyor being a belt having an upper surface suitable for receiving a pot thereon, said upper surface being devoid of any pot-receiving fixtures extending upwardly therefrom, said first conveyor having a loading end and a discharge end, said first conveyor following an entirely linear path from said loading end to said discharge end;
    a second conveyor suitable for receiving soil thereon, said second conveyor having an end positioned so as to deliver soil to the pot on the first conveyor;
    a drill positioned above said upper surface of said first conveyor, said drill being movable upwardly and downwardly relative to the pot on said first conveyor so as to form a hole in the soil in the pot; and
    a driving means cooperative with said first conveyor for moving said first conveyor in an indexing manner such that said first conveyor temporarily stops at a location directly below said drill.

2. The potting apparatus of claim 1, further comprising:
    a hopper positioned at an opposite end of said second conveyor, said hopper suitable for receiving soil therein, said second conveyor suitable for moving the soil from said hopper.

3. The potting apparatus of claim 2, said second conveyor positioned in a channel, said second conveyor being a chain having bars extending across a portion of said channel, said bars being in generally spaced parallel relation to each other.

4. The potting apparatus of claim 1, said drill being slidably supported on a frame, the potting apparatus further comprising:
    a belt connected to said drill; and
    a servomotor drivingly connected to said belt so as to move the drill in an upward direction or a downward direction.

5. The potting apparatus of claim 4, further comprising:
    a packing plate resiliently positioned in relation to said drill, said packing plate having a diameter equal to or greater than a diameter of the pot.

6. The potting apparatus of claim 5, said packing plate having an aperture formed therein, said drill positioned so as to be extendable through said aperture when the drill forms a hole in the soil of the pot.

7. The potting apparatus of claim 4, further comprising:
    a sensing means positioned upstream of said drill for sensing when the pot is directly below said drill.

8. The potting apparatus of claim 1, further comprising:
    a plurality of shafts positioned downstream of said discharge end of said first conveyor, said plurality of shafts arranged in spaced parallel relation.

9. The potting apparatus of claim 8, said plurality of shafts having roller members affixed thereto, the potting apparatus further comprising:
    a means for rotating said plurality of shafts so as to cause the pot thereon to move therealong.

10. The potting apparatus of claim 8, further comprising:
    a bin positioned below the plurality of shafts so as to receive residual soil from said first conveyor as passed through spaces between said plurality of shafts; and
    an auger extending into said bin so as to move the residual soil from said bin back to said second conveyor.

11. The potting apparatus of claim 1, said first conveyor extending in a direction transverse to a direction of said second conveyor.

12. A potting apparatus comprising:
    a first conveyor being a belt having an upper surface suitable for receiving a pot thereon, said upper surface being devoid of any pot-receiving fixtures thereon;
    a second conveyor suitable for receiving soil thereon, said second conveyor having an end positioned so as to deliver soil to the pot on the first conveyor;
    a drill positioned above said upper surface of said first conveyor, said drill being movable upwardly and downwardly relative to the pot on said first conveyor so as to form a hole in the soil in the pot;
    a driving means cooperative with said first conveyor for moving said first conveyor in an indexing manner such that said first conveyor temporarily stops at a location directly below said drill;
    a sweeper positioned upstream of said drill, said sweeper suitable for sweeping soil extending above a vertical axis;

a shaft extending vertically and rotatable about a vertical axis;

at least one arm extending radially outwardly of said shaft adjacent a lower end of said shaft;

a brush affixed to the arm and extending downwardly, therefrom; and a means for driving said shaft in rotation such that said brush moves in a horizontal plane.

13. A potting apparatus comprising:

a first conveyor being a belt having an upper surface suitable for receiving a pot thereon, said upper surface being devoid of any pot-receiving fixtures extending upwardly therefrom, said first conveyor having a loading end and a discharge end, said first conveyor following an entirely linear path from said loading end to said discharge end;

a second conveyor suitable for receiving soil thereon, said second conveyor having an end positioned so as to deliver soil to the pot on the first conveyor;

a drill positioned above said upper surface of said first conveyor, said drill being movable upwardly and downwardly relative to the pot on said first conveyor so as to form a hole in the soil in the pot; and a driving means cooperative with said first conveyor for moving said first conveyor in an indexing manner such that said first conveyor temporarily stops at a location directly below said drill, said driving means for moving said first conveyor from another location to said location directly below said drill in a pattern which slowly accelerates up from said another location and which slowly decelerates toward said location directly below said drill and for having a maximum speed between the location.

\* \* \* \* \*